United States Patent
Goldberger

[15] 3,673,801
[45] July 4, 1972

[54] PROPULSION METHOD USING CATALYTIC DECOMPOSITION OF HYDRAZINE

[72] Inventor: Max Goldberger, Wapping, Conn.
[73] Assignee: Pioneer Research, Inc., Manchester, Conn.
[22] Filed: Sept. 23, 1968
[21] Appl. No.: 761,880

Related U.S. Application Data

[63] Continuation-in-part of Ser. No. 583,057, Sept. 29, 1966, abandoned.

[52] U.S. Cl..................................60/218, 149/36, 252/459
[51] Int. Cl. .........................................................C06d 5/04
[58] Field of Search...............252/459; 60/218, 219; 149/36; 23/212

[56] References Cited

UNITED STATES PATENTS

| | | | |
|---|---|---|---|
| 3,021,667 | 2/1962 | Griffin | 60/219 X |
| 3,081,595 | 3/1963 | Rose | 60/219 X |
| 3,086,945 | 4/1963 | Cohn | 149/36 X |

Primary Examiner—Benjamin R. Padgett
Attorney—Sandoe, Neill, Schottler & Wikstrom

[57] ABSTRACT

A method is provided for decomposing fuel comprising substantially hydrazine in which the hydrazine is brought in contact with a catalyst consisting essentially of solid porous Raney cobalt. The catalyst may be adheringly supported onto a substrate, such as a foraminous nickel substrate, which has particular use in a propulsion system wherein fuel injected into a propulsion chamber is caused to contact the catalyst, whereby to decompose said fuel and effectively produce propulsion.

3 Claims, 3 Drawing Figures

PATENTED JUL 4 1972
3,673,801
FIG. 1.
FIG. 3.
FIG. 2.
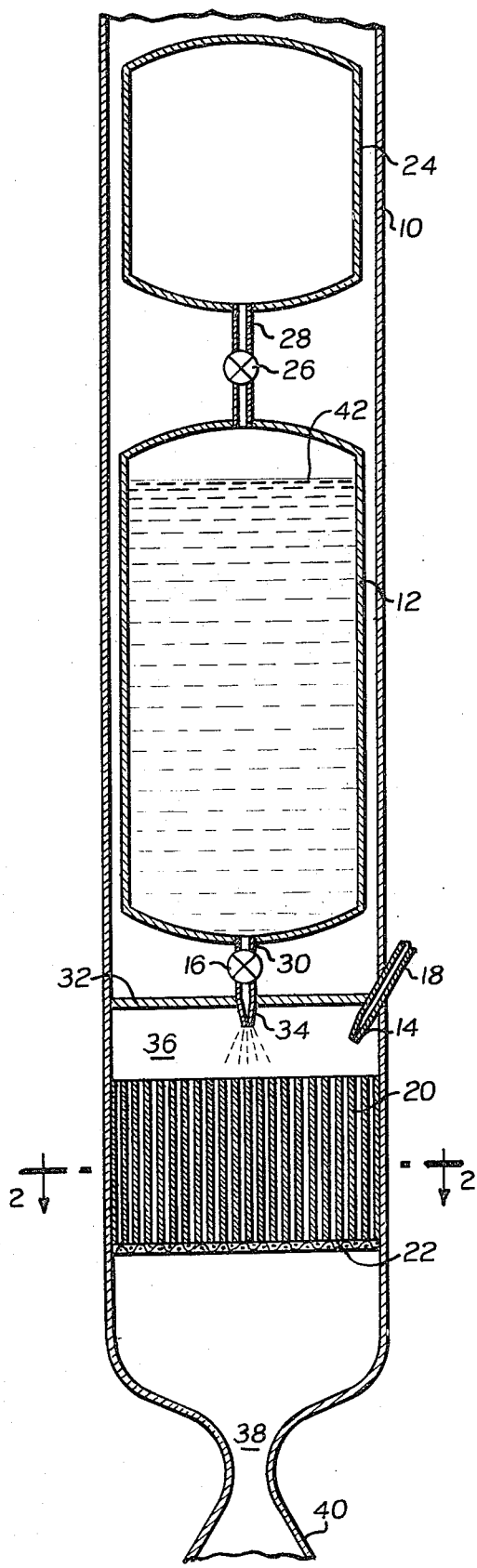
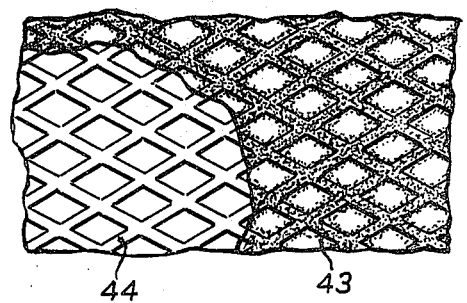
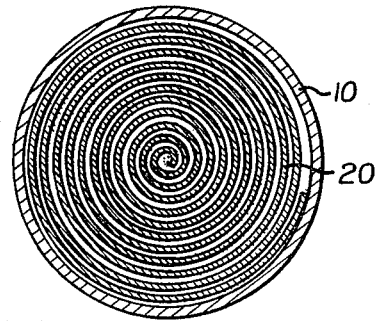
INVENTOR
MAX GOLDBERGER
BY Sandoe, Neill,
Schottle & Wilstrom
ATTORNEYS.

PROPULSION METHOD USING CATALYTIC DECOMPOSITION OF HYDRAZINE

This application is a continuation-in-part of my U.S. Pat. application Ser. No. 583,057, filed Sept. 29, 1966 for "Decomposition of Hydrazine" and now abandoned.

This invention particularly relates to the catalytic decomposition of hydrazine and to an improved Raney cobalt catalyst useful in such decomposition.

In many applications, it is desirable to catalytically decompose hydrazine. For example, the catalytic decomposition of hydrazine is often used in various propulsion systems using the byproducts of decomposition as the propellant jet. In addition, the decomposition of hydrazine is often used in turbine systems in which decomposed hydrazine produces the gas flow for propelling the turbine. Also, catalytic hydrazine decomposition is used in fuel cells and is also useful in the speedy formation of large gas volumes.

The art has provided various arrangements for catalytic decomposition of hydrazine. However, the catalysts used have normally been formed of rare earths and the platinum black families. Such catalysts have many disadvantages. In general, such catalysts are very expensive and are normally nonconductive when in catalytic form. The nonconductivity or high resistance inhibits employment of such catalysts on the surface of electrodes. Also, since such catalysts are provided only through relatively sophisticated reduction processes from oxide compounds, it has been found very difficult to form the catalyst in useful physical forms. For example, it is not uncommon to use Raney nickel in the form of a powder or wet paste. Catalysts heretofore applied to supporting substrates had the disadvantage in that the bond was usually extremely weak and during the reaction, the catalytic surface would often be seriously damaged and/or destroyed. This is particularly noticeable in propulsion systems where vibration and high gas pressures and gas flow velocities are encountered. In this connection, powdered Raney nickel and Raney cobalt have their limitations. In such systems, the catalysts are destroyed so rapidly that excessive amounts of catalysts must be supplied initially so that sufficient catalysts remain for the reaction throughout the desired operating interval.

It is, therefore, an object of the present invention to provide an improved method for the catalytic decomposition of hydrazine using a Raney cobalt catalyst in the form of a coherent, solid, porous element.

Another object of the present invention is to provide an improved Raney cobalt catalyst in the form of a coherent, solid, porous element and a method of making such catalyst.

A further object is to provide a propulsion system in which Raney cobalt in the form of a coherent, solid, porous element is an essential component of the system.

A still another object is to provide a method of propulsion by decomposing a fuel comprising substantially hydrazine utilizing a Raney cobalt catalyst in the form of a coherent, solid, porous, structural element.

As an additional object, the present invention provides a method for producing a coherent, solid, porous element of Raney cobalt for use in decomposing hydrazine.

These and other objects will more clearly appear when taken in conjunction with the following disclosure and the accompanying drawings, wherein:

FIG. 1 is a schematic representation in cross section of a propulsion motor utilizing the invention;

FIG. 2 is a section taken along lines 2—2 of FIG. 1; and

FIG. 3 is an enlarged fragment of a Raney cobalt catalyst in the form of a coherent, solid, porous element.

Stating it broadly, the various embodiments of the invention reside in a method for decomposing a fuel comprising substantially hydrazine utilizing a Raney cobalt catalyst in the form of a coherent, solid, porous element; in a method for providing propulsion by catalytically decomposing within a propulsion chamber a fuel comprised substantially of hydrazine, utilizing a coherent, solid porous element of Raney cobalt, in a method for immediately decomposing liquid hydrazine to form a large volume of gas; in a method for producing a coherent, solid porous element of Raney cobalt; and in the catalyst element itself.

The decomposition of hydrazine involves at least one, and usually both, of the reactions given in the Equations 1 and 2 set forth below:

Equation 1: $3N_2H_4 \rightarrow N_2 + 4NH_3 + kcal.$

Equation 2: $N_2H_4 \rightarrow N_2 + 2H_2 + kcal.$

It has been found that a Raney cobalt catalyst according to the present invention exhibits surprising and unexpected characteristics as a catalyst in the decomposition of hydrazine.

As the starting time in propulsion systems is important, it has been found, surprisingly, that the Raney cobalt catalyst according to the present invention reduces the normally conventional starting time to a faction thereof.

In propulsion systems in which hydrazine is utilized as the main fuel or as one of the fuels, the decomposition rate is also important. Heat is released upon decomposition of hydrazine and this heat together with the increase in volume resulting from the decomposition of hydrazine is utilized to obtain a propulsive stream of gases. The heat release is increased in proportion to the increase in the speed of decomposition of hydrazine. This is important whether hydrazine is used alone as the propulsion fuel or whether other propulsion fuels or propulsive gas streams are used. It has been found unexpectedly that the speed of decomposition of hydrazine is increased manifold if the catalyst of the present invention is used.

In accordance with one embodiment of the invention, a coherent, solid, porous Raney cobalt catalyst is formed. To form the catalytic surface, Raney cobalt surface powder consisting of 50 percent aluminum, 50 percent cobalt, available commercially from W. R. Grace Corporation, Baltimore, Md., as No. 2713, 50—50 aluminum-cobalt non-active powder, is used as the feed to an Avco plasma dynamic spray gun. An open mesh metallic screen or foraminous substrate is sprayed with the spray gun which at least partially melts the alloy powder during a spraying process from a distance of five inches until the entire surface is built up with a thin coating. The nozzle of the gun is then moved back to approximately 10 inches and spraying continued until a surface sheet 0.5 mm thick is built up. This process is repeated on the uncoated side of the screen. The coated screen is them immersed in a 5 percent sodium hydroxide solution in water (50 grams of sodium hydroxide in 1 liter of water) at room temperature. Hydrogen evolves as the aluminum component is leached from the alloy. When hydrogen evolution stops, the temperature is raised in small steps and held until further hydrogen evolution stops. The final temperature employed is approximately 80° C. Not all the aluminum need be leached out.

It is believed that the leaching of aluminum from the aluminum-cobalt alloy provides a catalytic Raney cobalt surface in which the cobalt has a defect in its lattice structure which assists in the catalytic decomposition of hydrazine.

The catalyst provided by the invention for hydrazine decomposition can be adapted by treatment to resist poisoning by sea water. This is important where the catalyst is employed in water-to-air rockets or missiles.

An advantage of the Raney cobalt catalyst provided by the invention is that it can be metallurgically prepared in very large sizes and quantities. The supporting substrates can be conductive metals and since the catalyst itself is conductive, a catalyst coated metal substrate can be employed as electrodes in fuel cells using hydrazine as a fuel, with the catalytic surface providing the anode electrode for the cells. For other applications such as propulsion systems, the catalyst can be applied to strong foraminous substrates such as ceramic honeycombs enabling the material to withstand high temperatures (over 2000° F) without deterioration and high stress without mechanical destruction. As is apparent, the catalyst is economical since the basic material is both cheap and available in large quantities. Further, the catalyst can be formed in self-supporting sheets.

The volume of the gases from the decomposition of the hydrazine is increased more than a thousand fold upon decomposition. As will be appreciated, such an increase in volume will exert high loads and stresses on the catalyst. Additionally, the catalyst is generally heated to a high temperature within a very short time. It has been found that the porous coherent catalyst of the present invention will withstand such loads and stresses including shock loads even when the starting time is reduced and the decomposition rate is increased without substantially adversely affecting the catalytic element.

As illustrative of the efficacy of the catalyst in decomposing hydrazine, the following example is given:

EXAMPLE 1

A sheet of 5 cm$^2$ is prepared as detailed above, to provide a coherent, solid, porous catalytic Raney cobalt surface. On this sheet is dropped 80 cm$^3$ $N_2H_2$ 85 percent concentration (hydrazine hydrate) for 20 minutes without interruption and catalytic decomposition continued without change during the reaction time. This demonstrates that the hydrazine has been catalytically decomposed and is not reacting with the metallic structure. During the reaction some ammonia fumes are evolved, indicating that both reactions of Equations 1 and 2 are underway.

The catalyst is subject to drop tests, as indicated in Example 2. For this test, 100 mg of Raney cobalt catalyst is prepared. Hydrazine 85–90 percent concentration is then applied to the 100 mg of Raney cobalt in drops. The time for initiation of reaction and the running time of the reaction for complete decomposition is given in Example 2.

EXAMPLE 2

| Run | $N_2H_4$ | Time for Reaction Start | Running Time (Reaction Time) |
| --- | --- | --- | --- |
| 1 | 1 drop | 30 sec. | 4 |
| 2 | 1 drop | 1 sec. | 4 |
| 3 | 1 drop | 1 sec. | 2 |
| 4 | 2 drops | 0 (spontaneous) | 4 |
| 5 | 3 drops | 0 (spontaneous) | 7 |
| 6 | 3 drops | 0 (spontaneous) | 8 |

Several observations can be made from the test provided in Example 2. The first observation is that the catalytic material improved in the speed of reaction after the initial reaction. Thus, when the first drop was applied, 30 seconds elapsed before reaction was initiated. When the second drop was applied, the time of the reaction decreased to 1 second and, by the fourth run, the reaction was spontaneous. Similarly, the running time improved after the initial run. It will, of course, be noted when three drops were applied, the reaction time increased disproportionately, indicating that the small amount of catalyst had been flooded and the reaction inhibited by the lack of mechanical contact between the entire mass of hydrazine and the catalytic surface.

For propulsion systems, the decomposition method employing the Raney cobalt catalyst offers certain additional advantages. For example, common fuels for propulsion systems utilize hydrazine and hydrogen peroxide reacted together in the propulsion chamber. Using the catalyst prepared as explained above, provides a propulsion arrangement with advantages over existing systems. The hydrazine and the hydrogen peroxide are contained in independent tanks and admitted to a propulsion chamber by spraying the fuels on the catalyst surface. In addition, however, the large surface area provided by the leaching of the aluminum from the Raney cobalt alloy decomposes the hydrogen peroxide. Thus, with such a propulsion system, the propelling force may be obtained from either of the two fuels or from the combination of the two fuels. The specific impulses obtainable are provided in Example 3.

EXAMPLE 3

| Fuel | Reaction | Specific Impulse |
| --- | --- | --- |
| $H_2O_2$ | $2H_2O_2 \rightarrow 2H_2O+O_2+46$ k cal | 160 sec. |
| $N_2H_2$ | (See Equations 1&2) +80 k cal | 240 sec. |
| Both | $N_2H_4+H_2O_2 \rightarrow N_2+2H_2O+126$ k cal (minimum) | 280–300 sec. |

Similarly, a propulsion fuel consisting of a mixture of hydrazine and ammonium nitrate, $NH_4 NO_3$ may be used. This fuel has the advantage that the two components can be mixed and applied to the Raney cobalt catalyst in the propulsion chamber. However, hydrazine can be used alone.

Discussing the drawings in detail, the propulsion motor comprises an outer cylinder 10 having located within it a tank 24 containing some inert gas, such as nitrogen, under pressure. The tank 24 has an exit pipe 28 connecting said tank to tank 12 also within the cylinder. Tank 12 contains liquid hydrazine. Valve 26 is provided in the pipe 28 so that the inert gas from tank 24 can be connected to or shut off from the tank 12. Tank 12 has an exit pipe 30 coupled to control valve 16 which controls the flow of hydrazine to nozzle 34.

The lower part of cylinder 10 contains a firing chamber 36 which terminates into a constricted portion 38. The cylinder thereafter is flared outwardly as shown at 40. A barrier 32 separates the firing chamber 36 from the storage part of cylinder 10. Pipe 30 and nozzle 34 pass through an appropriate orifice in the barrier 32, nozzle 34 entering the firing chamber 36.

Anchored to the walls of cylinder 10 within the firing chamber 36 is the coherent, solid porous catalyst of the present invention. Catalyst 20 is a sheet material rolled into a spiral formation as illustrated in FIG. 2. In the arrangement shown, the porous solid Raney cobalt, which is supported on a flattened expanded or foraminous nickel sheet, is rolled sufficiently tight so that the maximum amount of catalyst can be located within the walls of cylinder 10. The catalyst 20 is securely anchored to the walls of cylinder 10 and to screen 22.

One embodiment of the catalyst is shown in FIG. 3 comprising solid, porous Raney cobalt 43 in adhering contact to an expanded nickel sheet 44, the Raney cobalt being on either or both sides of the sheet. Preferably, the expanded nickel sheet is flattened.

The operation of the propulsion motor may be conveniently arranged as follows. Valve 26 is opened to allow the nitrogen to exert pressure on the surface of the hydrazine in tank 12. The level of hydrazine in tank 12 is indicated at 42. Valve 16 is opened slightly to spray initially a small amount of hydrazine onto the catalyst 22. The hydrazine will decompose and the temperature of the catalyst and the temperature in the firing chamber 36 will be increased substantially. After the appropriate time, which might be a few seconds or a few microseconds, valve 16 will be opened fully to allow a predetermined maximum amount of hydrazine to be sprayed onto the catalyst. The time of the initial spraying depends on the construction of the propulsion motor. It depends, additionally, on the treatment given to the catalyst and the ambient surroundings. The catalyst of the present invention is such that the starting time can be reduced to a few micro-seconds for a hot catalytic bed.

Hydrazine can be used as the only fuel, as illustrated above. Where additional fuel, such as hydrogen peroxide or ammonia nitrate are employed, these may be introduced through a pipe 18 into cylinder 10 and sprayed by nozzle 14 onto the catalyst.

The propellant employed in the test comprised 74 percent by weight $N_2H_4$, 25 percent by weight HN and 1 percent by weight $H_2O$. The tank pressure was 500 psi which resulted in a propellant flow of 50 grams per second through the nozzle 18. The engine was run for 240 seconds, developing a maximum chamber pressure (downstream pressure) of 300 psi and developing 15–17 lbs. thrust. The steady state run was extremely smooth with roughness less than ± 0.4 percent. The engine was pulsed at random during the run with the off time less than 1 second. Ignition delay (hot) was 3 milliseconds, response time 23 milliseconds and tail off time less than 170 milliseconds. The chamber temperature ranged from about 1,400° to 1,800° F. To check catalyst deterioration, the engine was stopped and rested for one week. At the end of the week, the engine was run for 600 seconds on hydrazine hydrate, 75 percent by weight. The second run exhibited the same smooth steady state characteristics.

While the catalyst shown in FIGS. 1 and 2 is in the form of a tightly rolled sheet, other arrangements can be used, for example, by placing the Raney cobalt catalyst in any other shape and form within the firing chamber 36 so long as the solid, porous catalyst is structurally sound.

The Raney cobalt catalyst of the invention is particularly advantageous over Raney nickel in decomposing hydrazine. Comparison tests were made between Raney cobalt and Raney nickel supported on an expanded or foraminous nickel sheet.

The tests enable the comparison of the time required to start the decomposition reaction and the total running time of the reaction. It is desirable that the total running time be short as the amount of energy released per unit time has a bearing on the amount of generated thrust in a propulsion system. In carrying out the tests (note the table below), a drop of hydrazine is dropped upon the catalyst and allowed to react completely (Run. No. 1). Following completion of the reaction, a second drop is added (Run No. 2). Following completion of the reaction of the second run, a third drop is added (Run. No. 3), and so on. The results obtained are as follows:

| Run No. | Start $N_2H_4$ | Time for Reaction Raney Ni | Time for Reaction Raney Co | Reaction Time Raney Ni | Reaction Time Raney Co | % Reaction Time Ni:Co |
| --- | --- | --- | --- | --- | --- | --- |
| 1 | 1 drop | 40 sec. | 30 sec. | 15 sec. | 4 sec. | 375% |
| 2 | 1 drop | 2 sec. | 1 sec. | 6 sec. | 4 sec. | 150% |
| 3 | 1 drop | 2 sec. | 1 sec. | 4 sec. | 2 sec. | 200% |
| 4 | 2 drops | spontaneous | | 6 sec. | 2 sec. | 300% |
| 4 | 3 drops | spontaneous | | 22 sec. | 5 sec. | 440% |
| 6 | 3 drops | spontaneous | | 20 sec. | 4 sec. | 500% |

As will be noted from the foregoing table, both the Raney nickel and cobalt catalysts improve in the speed of reaction after the application of the first drop until the fourth addition of two drops of hydrazine (Run No. 4), following which the reaction is spontaneous. In the fifth and sixth runs, three drops each of hydrazine were added.

However, it will be noted that marked differences in behavior of the two catalysts show up in the reaction time. Using cobalt reaction time as a reference, it is observed that the hydrazine decomposes at a much slower rate with Raney nickel than with Raney cobalt (note the last column of the table). This difference is particularly marked when two or more drops are applied to the catalysts (Run Nos. 4, 5 and 6), the reaction times for Raney nickel being 300 percent, 440 percent and 500 percent, respectively, longer than those obtained for Raney cobalt.

The solid porous Raney cobalt catalyst may be used as an electrode. Self-supporting solid porous Raney cobalt is preferred in this arrangement. A self-supporting solid porous Raney cobalt can be obtained by spraying the Raney cobalt-aluminum alloy onto a substrate and thereafter leaching away the substrate or removing it mechanically. Still another method of obtaining self-supporting solid porous Raney cobalt is to peel the sprayed Raney cobalt from the substrate. The aluminum and the substrate may conveniently be leached away with an alkaline solution such as sodium or potassium hydroxide. Some residual aluminum up to 5 percent will normally remain; however, for most applications, this is not objectionable. Further leaching will remove even this residual aluminum or any remaining substrate, if so desired.

Freshly prepared Raney cobalt is highly pyrophoric and is difficult to store. The pyrophoric characteristic can be inhibited or substantially reduced by forming a superficial oxide film on the Raney cobalt, for example, by conveniently immersing the same in water. Small amounts of hydrogen peroxide may be added to the water to accelerate the formation of the oxide film. The initial decomposition of hydrazine will remove this oxide film from the surface of the Raney cobalt.

As stated above, the improved catalyst is solid, porous Raney cobalt. The term "coherent" means that the porous Raney cobalt particles adhere to each other and are not in the form of loose, discrete particles such as in the form of powder or granules. Preferably, the Raney cobalt catalyst is adheringly supported on both faces of the substrate. However, it may be sufficient for some applications to have the catalyst adheringly supported on one face of the substrate only.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method for providing propulsion by catalytically decomposing within a propulsion chamber a fuel comprising substantially hydrazine which comprises, injecting said hydrazine into said propulsion chamber and causing it to contact a catalyst consisting essentially of adherent, solid, porous Raney cobalt adheringly supported on a substrate, whereby to decompose said fuel and effectively produce propulsion.

2. The method of claim 1, wherein said hydrazine is catalytically decomposed by causing it to contact said Raney cobalt adheringly supported on a foraminous metal substrate.

3. The method of claim 1, wherein said hydrazine is catalytically decomposed by causing it to contact said Raney cobalt adheringly supported on a ceramic honeycomb substrate.

* * * * *

UNITED STATES PATENT OFFICE
CERTIFICATE OF CORRECTION

Patent No. 3,673,801             Dated July 4, 1972

Inventor(s) Max Goldberger

It is certified that error appears in the above-identified patent and that said Letters Patent are hereby corrected as shown below:

Column 2, line 18, "faction" should read --fraction--.
         line 34, delete "surface", second occurrence
Column 5, lines 40 to 50, table should read as follows:

| Run. No. | $N_2H_4$ | Time for Reaction Start | | Reaction Time | | % Reaction Time | |
|---|---|---|---|---|---|---|---|
| | | Raney Ni | Raney Co | Raney Ni | Raney Co | Ni | Co |
| 1 | 1 drop | 40 sec. | 30 sec. | 15 sec. | 4 sec. | 375% | |
| 2 | 1 drop | 2 sec. | 1 sec. | 6 sec. | 4 sec. | 150% | |
| 3 | 1 drop | 2 sec. | 1 sec. | 4 sec. | 2 sec. | 200% | |
| 4 | 2 drops | spontaneous | | 6 sec. | 2 sec. | 300% | |
| 4 | 3 drops | spontaneous | | 22 sec. | 5 sec. | 440% | |
| 6 | 3 drops | spontaneous | | 20 sec. | 4 sec. | 500% | |

Signed and sealed this 20th day of March 1973.

(SEAL)
Attest:

EDWARD M. FLETCHER, JR.
Attesting Officer

ROBERT GOTTSCHALK
Commissioner of Patents